R. PENTLARGE.

Bungs for Casks.

No. 5,937. Reissued June 30, 1874.

Witnesses
A. H. Norris
Geo. W. Cushing Jr

Inventor
Rafeal Pentlarge
By Brown & Allen.
Attys.

N. PETERS, Photo-Lithographer, Washington, D. C.

UNITED STATES PATENT OFFICE.

RAFAEL PENTLARGE, OF WILLIAMSBURG, BROOKLYN, NEW YORK.

IMPROVEMENT IN BUNGS FOR CASKS.

Specification forming part of Letters Patent No. 148,747, dated March 17 1874; Reissue No. 5,937, dated June 30, 1874; application filed April 20, 1874.

*To all whom it may concern:*

Be it known that I, RAFAEL PENTLARGE, of Williamsburg, in the city of Brooklyn, in the county of Kings and State of New York, have invented an Improved Bung for Casks, of which the following is a specification:

The object of the invention is to provide for an easy tapping of the bung, for the purpose of inserting the vent-plug, and at the same time to prevent the loss, by the act of tapping or through the provision afforded for tapping, of the gases generated by fermentation. My invention consists in a wooden bung provided with a hole extending from one face nearly to the other, not entirely penetrating, but leaving a solid part of the bung remaining opposite to it, and the said hole being filled by a tightly-fitting plug driven into it. The solid part left opposite the hole, having the grain of the wood crosswise, entirely prevents the gas from escaping between the plug and bung, but being thin yields and breaks through readily when the vent-plug is driven into the bung.

Figure 1:
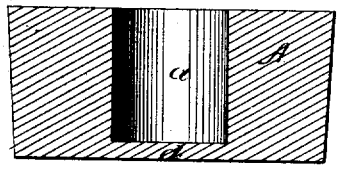
Figure 2:
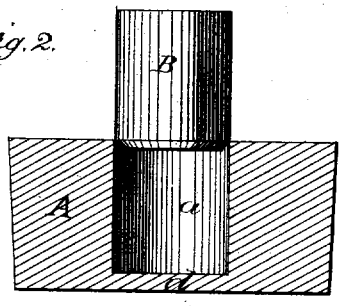
Figure 3:
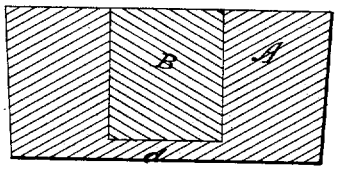
Figure 4:
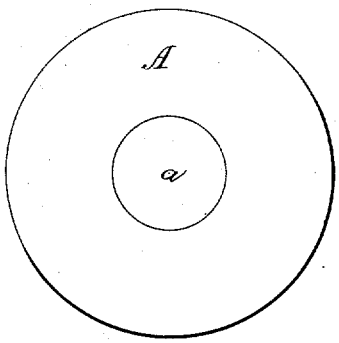
Figure 5:
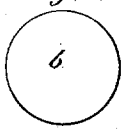

In the accompanying drawing, Figure 1 represents a central transverse section of the bung. Fig. 2 shows the same section with the plug in position to be driven into the bung. Fig. 3 shows the plug as driven into the bung, which is ready for use. Fig. 4 is a plan view of the bung. Fig. 5 is a plan view of the plug.

It is unimportant from which direction the hole is bored and the plug inserted into the bung; but the drawing represents the hole bored and the plug inserted from the larger and outer surface.

A is the bung, having the hole *a* bored into it, but not through it, allowing a part, *d*, to remain, so as to form a solid portion of the bung opposite the hole. This part is designed to give way under the strokes of a hammer or other instrument. The hole *a* is tightly plugged by the plug B, which is flush with the face of the bung from which it is inserted.

In tapping, the vent-plug is placed opposite the plug B, and as the vent-plug is driven into the bung the solid portion *d* is broken, and the plug B is driven through the hole. This bung, before the vent-plug is driven into it, keeps the cask perfectly tight, the unbroken or unpenetrated portion *d* effectually preventing any escape of gas. When the vent-plug is driven in, as above described, the inner plug B and the portion *d* pass into the cask, followed so closely by the vent-plug that there is no escape of gas from the cask.

What I claim as my invention is—

1. The bung A, provided with the hole *a*, and having a solid portion, *d*, opposite thereto, substantially as specified.

2. The plug B, in combination with the bung A, having a hole extending partly through it, substantially as and for the purpose set forth.

RAFAEL PENTLARGE.

Witnesses:

M. RYAN,

FRED. HAYNES.